US012031776B2

(12) United States Patent
Xu et al.

(10) Patent No.: US 12,031,776 B2
(45) Date of Patent: Jul. 9, 2024

(54) UNBLOCKING APPARATUS FOR FURNACE DISCHARGING PIPE AND USE METHOD

(71) Applicants: China Nuclear Sichuan Environmental Protection Engineering Co., Ltd., Guangyuan (CN); China Building Materials Academy, Beijing (CN); China Nuclear Power Engineering Co., Ltd., Beijing (CN)

(72) Inventors: Weidong Xu, Guangyuan (CN); Yu Chang, Guangyuan (CN); Yongchang Zhu, Beijing (CN); Hong Duan, Beijing (CN); Chunyu Tian, Guangyuan (CN); Wei Wu, Guangyuan (CN); Debo Yang, Beijing (CN); Qingbin Zhao, Beijing (CN); Shuaizhen Wu, Guangyuan (CN); Lin Wang, Guangyuan (CN); Zhu Cui, Beijing (CN); Heyi Guo, Beijing (CN); Maosong Fan, Guangyuan (CN); Yuancheng Sun, Beijing (CN); Jie Mei, Beijing (CN); Xiaoli An, Guangyuan (CN); Yongxiang Zhao, Beijing (CN); Qinda Liu, Beijing (CN)

(73) Assignees: China Nuclear Sichuan Environmental Protection Engineering Co., Ltd., Guangyuan (CN); China Building Materials Academy, Beijing (CN); China Nuclear Power Engineering Co., Ltd., Beijing (CN)

( * ) Notice: Subject to any disclaimer, the term of this patent is extended or adjusted under 35 U.S.C. 154(b) by 0 days.

(21) Appl. No.: 18/492,577

(22) Filed: Oct. 23, 2023

(65) Prior Publication Data

US 2024/0142175 A1 May 2, 2024

(30) Foreign Application Priority Data

Oct. 28, 2022 (CN) ......................... 202211335225.3

(51) Int. Cl.
*F27D 25/00* (2010.01)
*F27D 3/15* (2006.01)

(52) U.S. Cl.
CPC .............. *F27D 25/001* (2013.01); *F27D 3/15* (2013.01)

(58) Field of Classification Search
None
See application file for complete search history.

(56) References Cited

U.S. PATENT DOCUMENTS 3,458,396 A * 7/1969 Grant ......................... B25J 5/04 15/93.1

FOREIGN PATENT DOCUMENTS

CN 212760159 U 3/2021
CN 212778669 U 3/2021
(Continued)

OTHER PUBLICATIONS

Notification to Grant Patent Right for Invention issued in counterpart Chinese Patent Application No. 202211335225.3, dated Jul. 24, 2023.

*Primary Examiner* — Keith D. Hendricks
*Assistant Examiner* — Nikolas Takuya Pullen
(74) *Attorney, Agent, or Firm* — Westbridge IP LLC

(57) ABSTRACT

Disclosed are an unblocking apparatus for a furnace discharging pipe and a use method. The unblocking apparatus includes a rail, a rail car that may move along the rail, an unblocking drive mechanism arranged on the rail car, a heat-unblocking component, a cold-unblocking component, and a material receiving component that is used to receive a blocking material in the discharging pipe, and a drive end of (Continued)

the unblocking drive mechanism is detachably connected with one end of the heat-unblocking component and the cold-unblocking component respectively. The present application effectively handles different blockage situations of the furnace discharging pipe by connecting the unblocking drive mechanism with an unblocking rod capable of heat-unblocking and a drilling rod capable of cold-unblocking, thereby two modes of heat-unblocking and cold-unblocking are performed on the furnace discharging pipe; and the discharging pipe may be unblocked by a remote operation.

7 Claims, 4 Drawing Sheets

(56) References Cited

FOREIGN PATENT DOCUMENTS

| | | | |
|---|---|---|---|
| CN | 213335560 | U | 6/2021 |
| CN | 214732115 | U | 11/2021 |
| CN | 113865343 | A | 12/2021 |

* cited by examiner

UNBLOCKING APPARATUS FOR FURNACE DISCHARGING PIPE AND USE METHOD

CROSS-REFERENCE TO RELATED APPLICATIONS

This application claims priority to Chinese Patent Application No. 202211335225.3, filed on Oct. 28, 2022, which are incorporated herein by reference in their entirety.

TECHNICAL FIELD

The present application relates to the technical field of mechanical engineering, in particular to an unblocking apparatus for a furnace discharging pipe and a use method.

BACKGROUND

Usually, glass is used as a base material for solidification treatment of high-radioactive waste liquid. Stirring, mixing, and heating of the base material and waste liquid need to be performed in a furnace, and a radioactive molten material after the mixing flows out from a discharging pipe at the bottom of the furnace. In the production process, due to crystallization, metal deposition, and other reasons, the discharging pipe may be blocked, so that a blocking situation of coexistence of molten and hard substances may occur in the discharging pipe. In addition, due to the small inner diameter of the discharging pipe, the limited size of a heating rod, as well as the small contact area and thermal conductivity factor, it is difficult to fully melt a blockage by additionally mounting a heat guide rod in the middle of the discharging pipe; a flexible metal unblocking method has a certain effect on unblocking the blockage that is fully melted already and stuck in the discharging pipe, but a flexible unblocking material is difficult to achieve the unblocking of hard blockages; and the working environment of the unblocking apparatus for the furnace discharging pipe used for the solidification treatment of the high-radioactive waste liquid has a certain amount of radioactivity, and the operation of the apparatus and the replacement of damaged components need to be completed by remote operations.

For example, Chinese Patent Publication CN212760159U uses a mechanical transmission mode to rotate a drilling rod and may unblock the hard blockages, but this apparatus is mainly designed for the purpose of unblocking in the non-radioactive environment, and it is not convenient for the remote operation in the radioactive environment.

Chinese Patent Publication CN214732115U uses a hard metal unblocking rod to unblock a discharging pipe by a straight line movement mode, it has the better effects on viscous and partially hardened blockages, but may not effectively solve the problem of the hard blockages caused by crystallization. Therefore, there is a need for an apparatus that may unblock the furnace discharging pipe under radioactive environmental conditions.

SUMMARY

A purpose of the present application is to provide an unblocking apparatus for a furnace discharging pipe that may unblock viscous and hard crystal blockages in the furnace discharging pipe by a remote operation in a radioactive environment.

In order to achieve the above purpose, technical schemes adopted by the present application are as follows: the unblocking apparatus for the furnace discharging pipe includes a rail detachably mounted below a furnace, a rail car, an unblocking drive mechanism, a heat-unblocking component, a cold-unblocking component, and a material receiving component, the rail car may move along the rail, the unblocking drive mechanism is arranged on the trail car, the heat-unblocking component and the cold-unblocking component are used to unblock the furnace discharging pipe, a drive end of the unblocking drive mechanism is detachably connected with one end of the heat-unblocking component and the cold-unblocking component respectively, and the material receiving component is used to receive a blocking material in the discharging pipe.

Further, the rail car is composed of a car flat plate, horizontal plates respectively and fixedly connected to lower ends of front and rear sides of the car flat plate, longitudinal plates respectively fixed on both sides of a lower end of the car flat plate, and wheels symmetrically arranged on the longitudinal plate, side surfaces of the longitudinal plates are fixedly connected with both ends of the horizontal plates; and the horizontal plate located on the front side of the car flat plate is provided with a hook and a plurality of protruded stop blocks, and the car flat plate is further provided with a brake mechanism.

Further, the material receiving component is a flow guide groove, the unblocking drive mechanism includes an upright column, a gear rack, and a gearbox, upper and lower ends of the upright column are respectively and fixedly connected with an upright column bottom plate and an upright column top plate, the flow guide groove is fixedly connected above the upright column top plate, the upright column bottom plate is fixedly connected with the car flat plate, two ends of the gear rack are respectively and fixedly connected with the upright column bottom plate and the upright column top plate, the gearbox is meshed and connected with the gear rack by an internal gear to move along the gear rack, the gearbox is externally provided with a drive shaft, one end of the drive shaft passes through the gearbox and is connected with the gear, the gear may rotate synchronously with the drive shaft, the gearbox is provided with a dovetail groove mounting bracket, and the dovetail groove mounting bracket may be detachably connected with one end of the heat-unblocking component and the cold-unblocking component.

Further, the heat-unblocking component includes an adapter apparatus detachably connected with the dovetail groove mounting bracket and an unblocking rod capable of unblocking the viscous blocking material in the discharging pipe, a lower end of the unblocking rod is connected to the adapter apparatus by a quick connector, and the adapter apparatus is provided with a clamping block for easy operation by a mechanical arm.

Further, the unblocking rod is a solid metal cylinder of which a top portion is a conical barbed structure.

Further, the cold-unblocking component includes a drilling machine, a drilling rod, a water collection tank, and a water supply tank, the drilling rod is connected with a drive end of the drilling machine by the quick connector, one end of the drilling machine is detachably connected with the dovetail groove mounting bracket, and the water collection tank and the water supply tank are respectively arranged on the car flat plate by limiting blocks.

Further, the drilling rod is a hollow metal cylinder of which a top end is provided with an opening, and the opening is internally embedded with a diamond that is convenient for cutting glass inside the discharging pipe.

Further, the brake mechanism includes a brake rod of which a rod portion is provided with a thread, a threaded pipe of which an inner wall is provided with a thread, and a brake pad, the threaded pipe is arranged on the car flat plate and is aligned to the wheel, the brake rod is thread-connected with the threaded pipe, and the brake pad is axially and rotatably connected with the brake rod.

Further, the car flat plate is provided with a plurality of lifting rings.

The present application further provides a use method of the unblocking apparatus for the furnace discharging pipe, including the following steps:

Step 1: a molten pool and a discharging pipe of a furnace are heated, after a certain period of time, the heating of the molten pool is stopped, the heating of the discharging pipe is maintained, a heat-unblocking component is positioned under the furnace discharging pipe, and a brake mechanism is used to lock wheels;

Step 2: a master-slave mechanical arm is operated to rotate a drive shaft clockwise, so that a gearbox rises along a gear rack, and an unblocking rod connected to the gearbox may extend into the furnace discharging pipe with it at this moment, to heat-unblock the furnace;

Step 3: the master-slave mechanical arm is operated to rotate the drive shaft counterclockwise, so that the gearbox descends along the gear rack, the unblocking rod connected to the gearbox may extend out of the furnace discharging pipe with it at this moment;

Step 4: Steps 3 and 4 are repeated; if the heat-unblocking is successful, Step 5 is executed; and if the heat-unblocking is not successful, Step 6 is executed;

Step 5: the master-slave mechanical arm is operated to pull the unblocking apparatus, so that a flow guide groove is located below the furnace discharging pipe, an effluent is received, and the heating of the discharging pipe is stopped after the flow rate is stable; and after discharge is stopped, the master-slave mechanical arm is operated to pull a rail car, so that the unblocking apparatus is far away from the furnace;

Step 6: the heating of the molten pool and the discharging pipe is stopped, and at the same time, an adapter apparatus is removed from a dovetail groove mounting bracket, a drilling machine connected with the drilling rod is mounted on the dovetail groove mounting bracket, and a water supply and drainage pipe and a cable between the drilling rod, a water collection tank, and a water supply tank are connected respectively;

Step 7: cooling water is opened, the drilling machine is started to rotate the drilling rod, and the master-slave mechanical arm is operated to rotate the drive shaft clockwise, so that the drilling rod driven by the drilling machine extends into the furnace discharging pipe, to cold-unblock the furnace;

Step 8: the master-slave mechanical arm is operated to rotate the drive shaft counterclockwise, so that the drilling rod extends out of the furnace discharging pipe; and Step 9: Steps 8 and 9 are repeated until the unblocking is completed, and Step 5 is executed.

Compared with existing technologies, the present application has the following beneficial effects.

Firstly, in the present application, by connecting the unblocking drive mechanism with the unblocking rod capable of heat-unblocking and the drilling rod capable of cold-unblocking, two modes of heat-unblocking and cold-unblocking are performed on the furnace discharging pipe, thus different blockage situations of the furnace discharging pipe may be effectively handled.

Secondly, in the present application, the discharging pipe may be unblocked by the remote operation, to avoid an operator from entering a radioactive environment.

Lastly, in the present application, the unblocked blocking material may be collected and centrally treated by the flow guide groove arranged on the upright column top plate, to avoid the unblocking apparatus from being polluted.

DETAILED DESCRIPTION OF THE EMBODIMENTS

Figure 1:
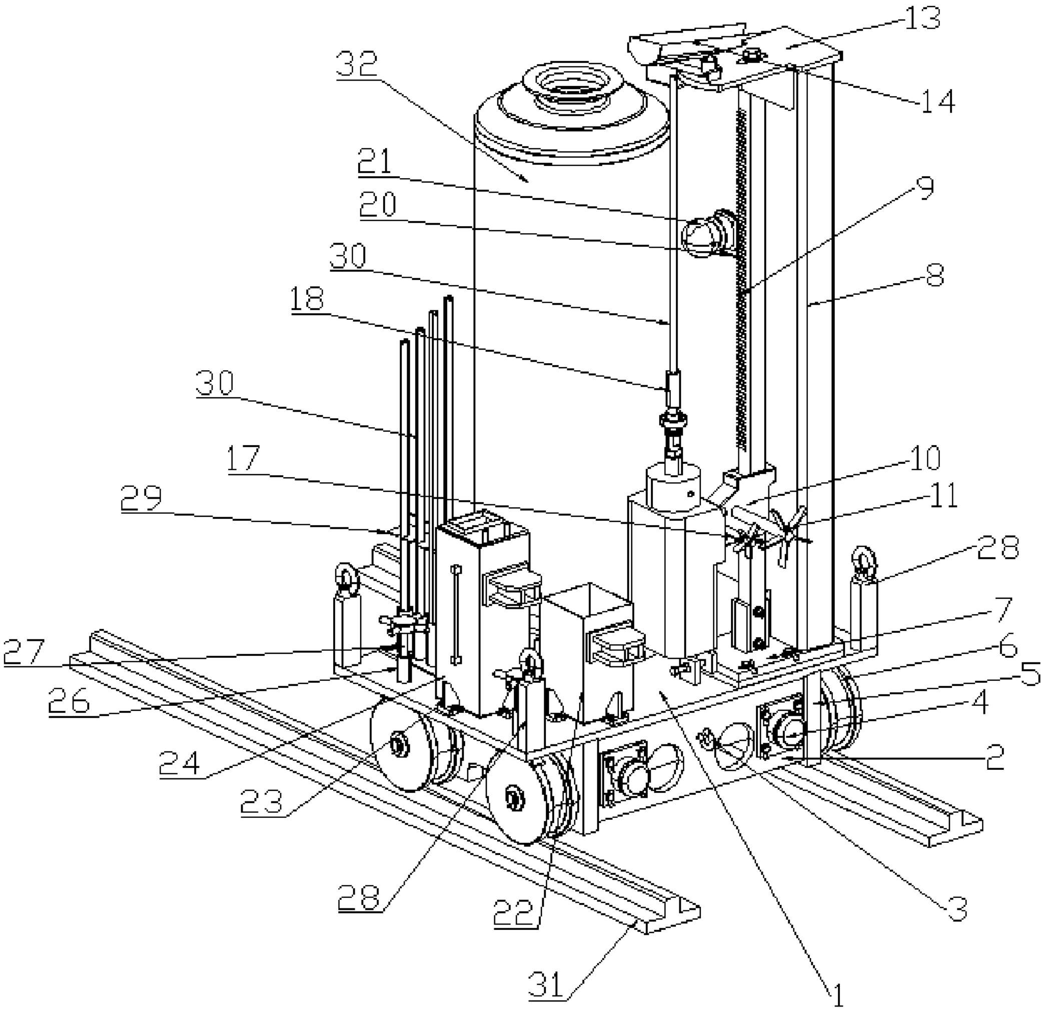
FIG. 1 is a structure schematic diagram of cold-unblocking in the present application.

Technical schemes in embodiments of the present application are clearly and completely described below in combination with drawings in the embodiments of the present application. Apparently, the embodiments described are only a part of the embodiments of the present application, not all of the embodiments. Based on the embodiments in the present application, all other embodiments obtained by those of ordinary skill in the art without creative labor shall fall within the scope of protection of the present application.

In the description of the present application, it should be understood that orientation or position relationships indicated by terms "up", "down", "top", "bottom", "left", "right" and the like are based on the orientation or position relationships shown in the drawings, only for the convenience of describing the present application and simplifying the description, rather than indicating or implying that an apparatus or an element referred to must have a specific orientation, or be constructed and operated in the specific orientation. Therefore, it may not be understood as limitation on the present application.

Referring to the overall structure schematic diagram of the present application in FIG. 1, an unblocking apparatus for a furnace discharging pipe is described in this embodiment. A horizontal plate 2 is welded on a front side of a lower end of a car flat plate 1, a longitudinal plate 5 is arranged on both sides of the lower end of the car flat plate 1, a side surface of the longitudinal plate 5 is welded to both ends of the horizontal plate 2, and a top portion of the longitudinal plate 5 is welded on lower end surfaces of both sides of the car flat plate 1; a hook 3 is welded in the middle of the horizontal plate 2; there are two stop blocks 4 arranged, and the two stop blocks 4 are connected to the horizontal 2 by bolts; the protruded stop block 4 may protect the unblocking apparatus; a wheel 6 is mounted on an outer side of the longitudinal plate 5, the wheel 6 may move on a rail 31, and the wheel 6 is provided with protrusions on both sides to prevent the wheel 6 from derailing.

Further, the car flat plate 1 is provided with a lifting ring 28, and the unblocking apparatus uses a crane to pull the lifting ring 28 for lifting in a hot room; and by moving a mobile car with a master-slave mechanical arm, the movement of the unblocking apparatus on the rail 31 may be achieved.

Upper and lower ends of an upright column 8 are respectively and fixedly connected to an upright column bottom plate 7 and an upright column top plate 13 by a welding mode, and a flow guide groove 14 is mounted on the upright column top plate 13; the upright column bottom plate 7 is fixedly connected to the car flat plate 1 by the bolts, a gear rack 9 is also mounted on the upright column bottom plate 7 and the upright column top plate 13, upper and lower ends of the gear rack 9 are respectively fixed between the upright column bottom plate 7 and the upright column top plate 13 by welding, a gearbox 10 is mounted on the gear rack 9, a gear inside the gearbox 10 is meshed and connected with the gear rack 9, the gearbox 10 is externally provided with a drive shaft 11, one end of the drive shaft 11 passes through the gearbox 10 and is connected with the gear, a dovetail groove mounting bracket 12 is mounted on a left side of the gearbox 10, and the dovetail groove mounting bracket 12 may be detachably connected with an adapter apparatus 15 or a drilling machine.

The adapter apparatus 15 is welded with a quick connector 18 and a clamping block 16 for easy operation of a mechanical arm, and a locking handle 17 that may fix the adapter apparatus 15 is mounted in a threaded hole of the dovetail groove mounting bracket 12; a lower end of an unblocking rod 19 used for heat-unblocking may be mounted on the quick connector 18; the car flat plate 1 is provided with a water collection tank 22 for collecting sewage in the cold-unblocking process and a water supply tank 24 for loading cooling water for a drilling rod, the water collection tank 22 is limited by surrounding limiting blocks 23, the limiting blocks 23 are connected to the car flat plate 1 by the bolts, and the water supply tank 24 is also placed on the car flat plate 1 by the surrounding limiting blocks 23. During cold-drilling, a water pump in the water supply tank 24 conveys water by a water pipe to a hollow structure inside the drilling rod 30, and the water flows out from the top of the drilling rod 30; and after the water flows out from the top of the drilling rod 30, it flows out along an outer wall of the drilling rod 30, a water receiving tray is arranged on a lower portion of the drilling rod 30, and the water in the tray flows into the water collection tank 22 by itself through the water pipe.

Preferably, the unblocking rod 19 is a solid metal cylinder of which a top portion is a conical barbed structure.

Further, the car flat plate is further provided with a drilling rod rack 29, the drilling rod rack 29 is connected to the car flat plate 1 by the bolts, the drilling rod 30 is placed on the drilling rod rack 29, a lower end of the drilling rod 30 is detachably connected with the quick connector 18, and the quick connector 18 is connected with a drive end of a drilling machine; and the drilling rod 30 is a hollow metal cylinder of which a top end is provided with an opening, and the opening is internally embedded with a diamond that is convenient for cutting glass in the discharging pipe.

By rotating the drive shaft 11 with the master-slave mechanical arm, the gear and the gear rack 9 are meshed and rotated, so that the gearbox 10 is lifted and lowered, and the unblocking rod 19 or the drilling rod 30 mounted above the gearbox 10 rises and descends with the gearbox 10; the master-slave mechanical arm is a common device in nuclear facilities, by which an operator may operate an object in a non-radioactive area; when the unblocking rod 19 is lifted, it may unblock a viscous blockage in the discharging pipe, and a groove at the top of the unblocking rod 19 may bring out the viscous blockage; and after the viscous blockage in the discharging pipe flows out, it may be received by the flow guide groove 14.

Preferably, the upright column 8 is further provided with a camera 21, the camera 21 is fixed to the upright column 8 by a camera mounting plate 20 welded to the upright column 8.

Figure 2:
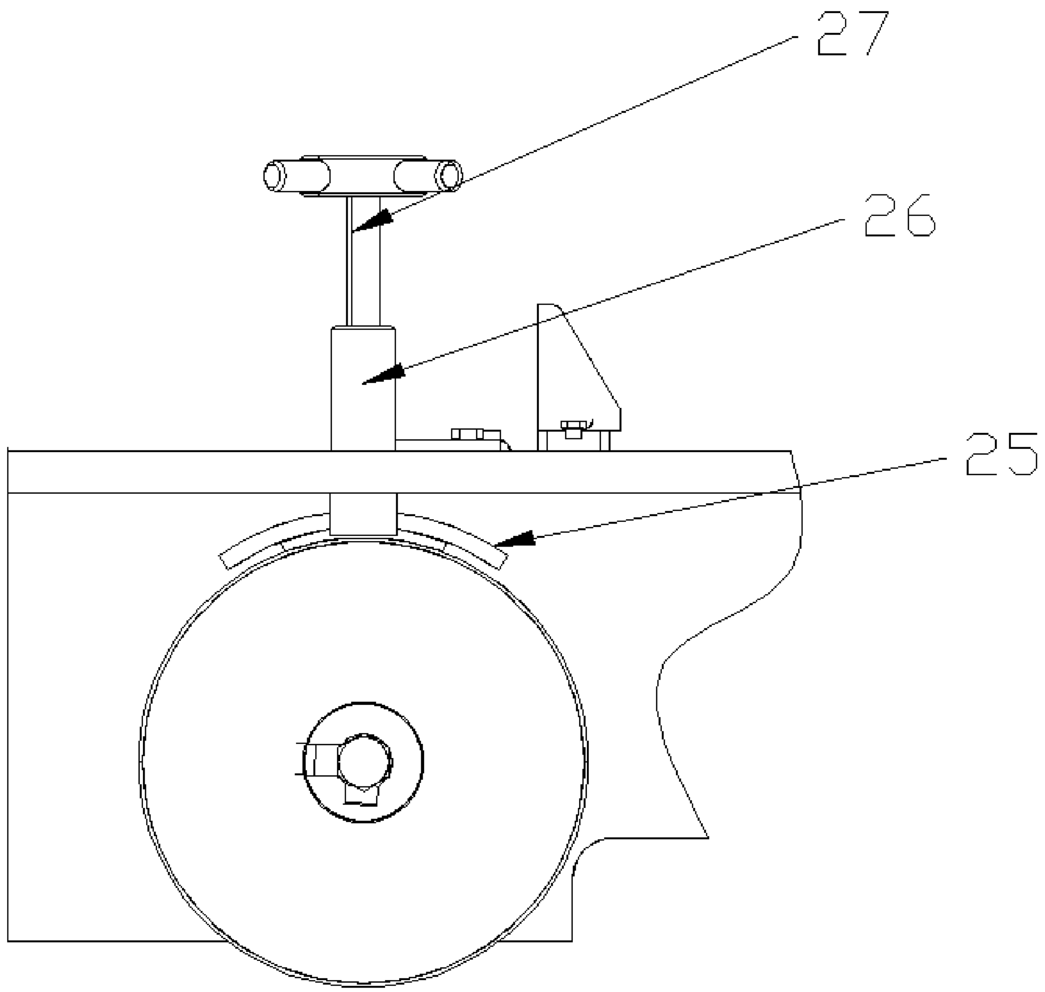
FIG. 2 is a structure schematic diagram of a brake mechanism in the present application.
Figure 3:
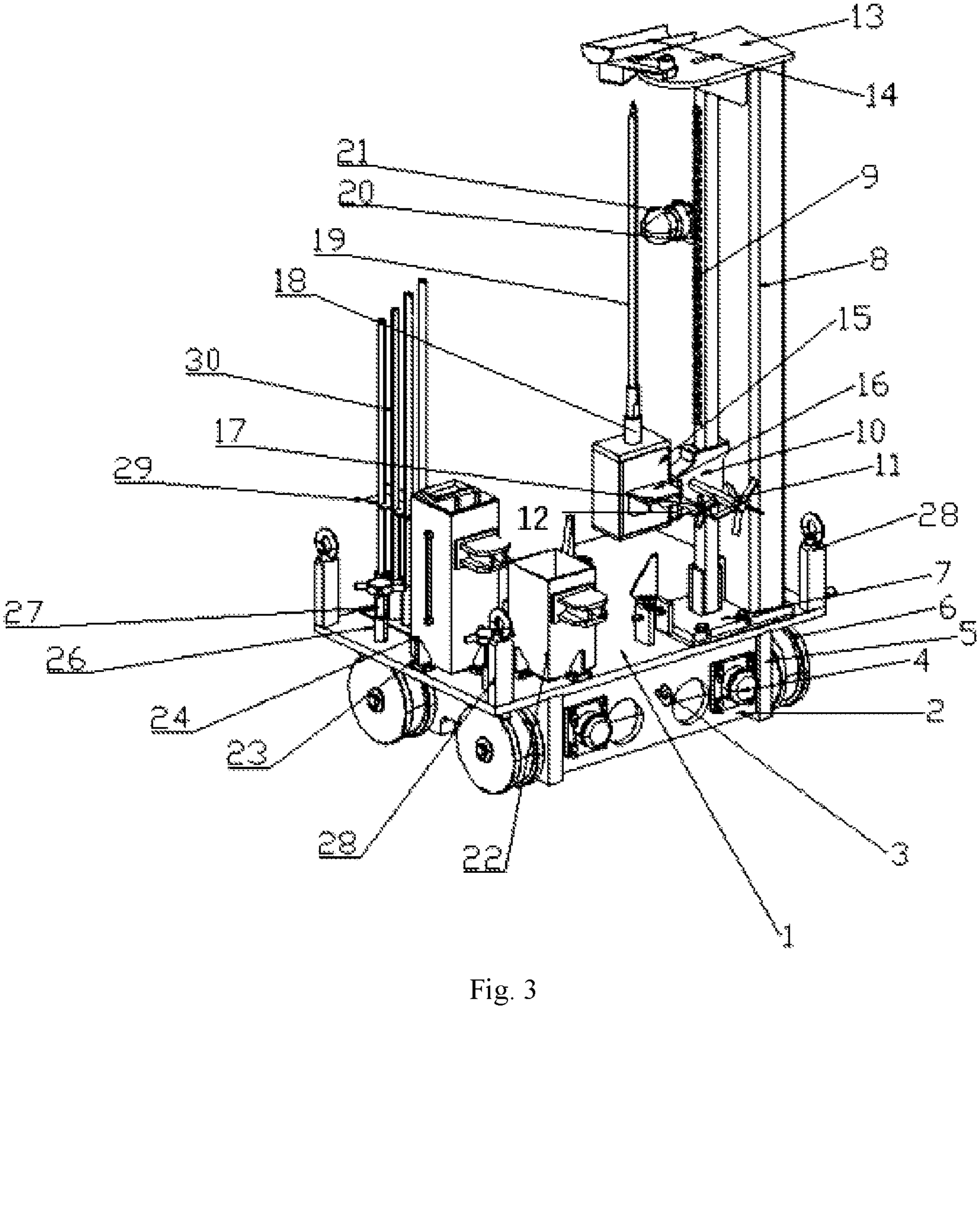
FIG. 3 is a structure schematic diagram of heat-unblocking in the present application.
Figure 4:
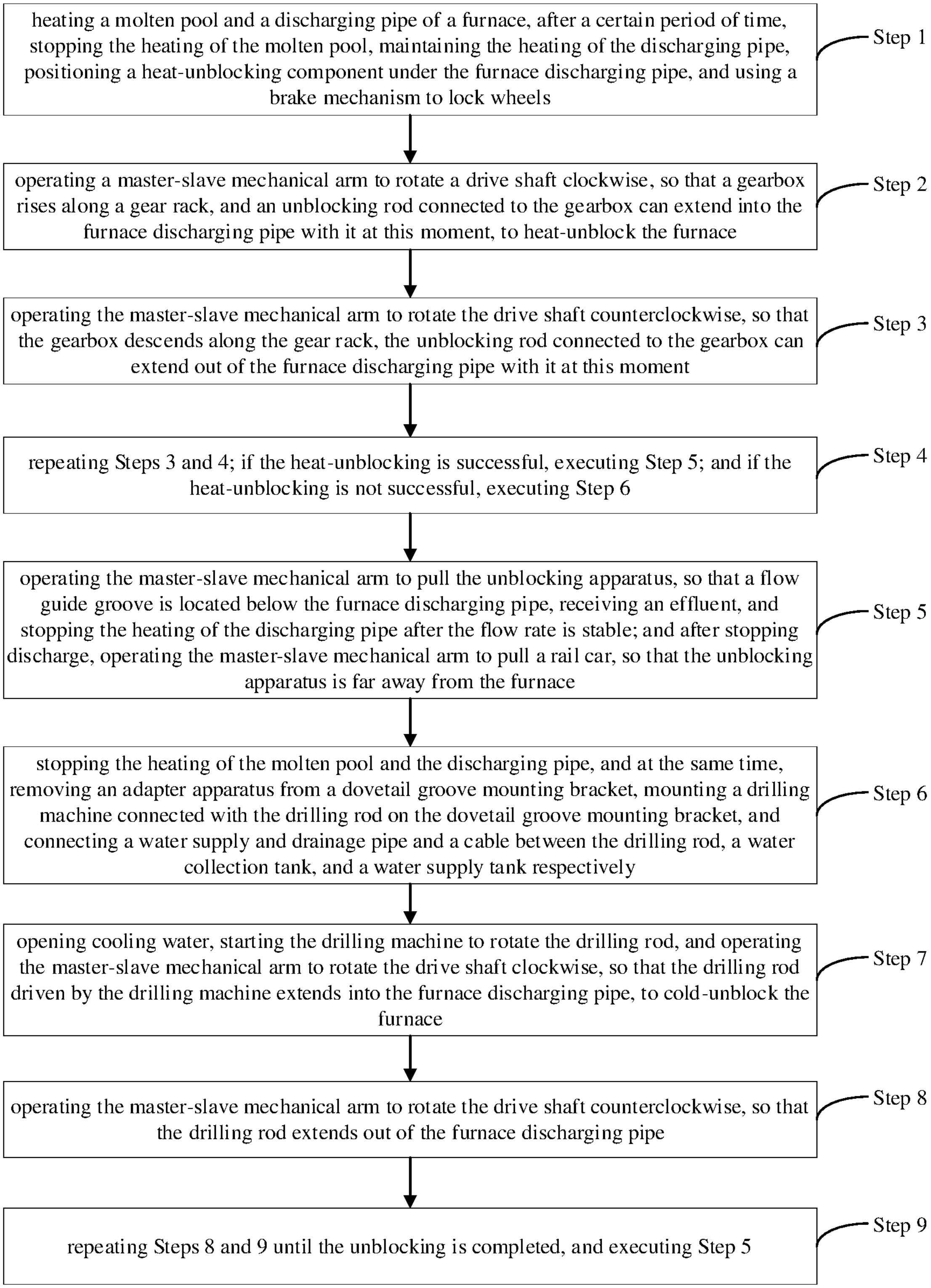
FIG. 4 is a use method of the unblocking apparatus in the present application.

Further, as shown in FIG. 2, a brake mechanism is arranged on the wheel 6, the brake mechanism includes a brake rod 27, a threaded pipe 26, and a brake pad 25, the brake rod 27 is thread-connected with an inner wall of the threaded pipe 26, and the brake pad 25 is mounted below the brake rod 27 and may rotate around an axis of the brake rod 27; and the brake pad 25 is axially and rotatably connected with a lower end of the brake rod 27, and the rotational connection may be achieved by arranging a bearing between the brake pad 25 and the brake rod 27.

A upper lifting rod is rotated clockwise, the brake rod 27 descends along the threaded pipe 26, the brake pad 25 compresses the wheel 6, and the wheel 6 is locked on the rail 31; and the brake rod 27 is rotated counterclockwise, the brake rod 27 rises along threaded pipe 26, the brake pad 25 releases the wheel 6, and the wheel 6 may move on the rail 31.

A receiving container 32 below a furnace for receiving solidified glass inside the furnace may be used in combination with the unblocking apparatus.

A use method of the unblocking apparatus in the present application includes the following steps.

Step 1: a molten pool and a discharging pipe of a furnace are heated, after a certain period of time, the heating of the molten pool is stopped, the heating of the discharging pipe is maintained, the unblocking apparatus is positioned under the furnace discharging pipe, and a brake mechanism is used to lock wheels 6.

Step 2: a master-slave mechanical arm is operated to rotate a drive shaft 11 clockwise, so that a gearbox 10 rises along a gear rack 9, and an unblocking rod 19 connected to the gearbox 10 may extend into the furnace discharging pipe with it at this moment, to heat-unblock the furnace.

Step 3: the master-slave mechanical arm is operated to rotate the drive shaft 11 counterclockwise, so that the gearbox 10 descends along the gear rack 9, the unblocking rod 19 connected to the gearbox 10 may extend out of the furnace discharging pipe with it at this moment.

Step 4: Steps 3 and 4 are repeated; if the heat-unblocking is successful, Step 5 is executed; and if the heat-unblocking is not successful, Step 6 is executed.

Step 5: the master-slave mechanical arm is operated to pull the unblocking apparatus, so that a flow guide groove 14 is located below the furnace discharging pipe, an effluent is received, and the heating of the discharging pipe is stopped after the flow rate is stable; and after discharge is stopped, the master-slave mechanical arm is operated to pull a rail car, so that the unblocking apparatus is far away from the furnace.

Step 6: the heating of the molten pool and the discharging pipe is stopped, and at the same time, an adapter apparatus 15 is removed from a dovetail groove mounting bracket 12, a drilling machine connected with a drilling rod 30 is mounted on the dovetail groove mounting bracket 12, and a water supply and drainage pipe and a cable between the drilling rod 30, a water collection tank 22, and a water supply tank 24 are connected respectively.

Step 7: cooling water is opened, the drilling machine is started to rotate the drilling rod 30, and the master-slave mechanical arm is operated to rotate the drive shaft 11 clockwise, so that the drilling rod 30 driven by the drilling machine extends into the furnace discharging pipe, to cold-unblock the furnace.

Step 8: the master-slave mechanical arm is operated to rotate the drive shaft 11 counterclockwise, so that the drilling rod 30 extends out of the furnace discharging pipe.

Step 9: Steps 8 and 9 are repeated until the unblocking is completed, and Step 5 is executed.

The above embodiment is only one of preferred embodiments of the present application. Any insignificant modifications or embellishments made in the main design concept and spirit of the present application, which still solve the technical problems consistent with the present application, should be included in the scope of protection of the present application.

What is claimed is:

1. An unblocking apparatus for a furnace discharging pipe, comprising a rail detachably mounted below a furnace, characterized in that it further comprises a rail car, an unblocking drive mechanism, a heat-unblocking component, a cold-unblocking component, and a material receiving component, the rail car can move along the rail, the unblocking drive mechanism is arranged on the rail car, the heat-unblocking component and the cold-unblocking component are used to unblock the furnace discharging pipe, a drive end of the unblocking drive mechanism is detachably connected with one end of the heat-unblocking component and the cold-unblocking component respectively, and the material receiving component is used to receive a blocking material in the discharging pipe; the unblocking drive mechanism comprises an upright column, a gear rack, and a gearbox, the gearbox is provided with a dovetail groove mounting bracket, and the dovetail groove mounting bracket can be detachably connected with one end of the heat-unblocking component and the cold-unblocking component;

the heat-unblocking component comprises an adapter apparatus detachably connected with the dovetail groove mounting bracket and an unblocking rod capable of unblocking a viscous blocking material in the discharging pipe, a lower end of the unblocking rod is connected to the adapter apparatus by a quick connector, and the adapter apparatus is provided with a clamping block for easy operation by a mechanical arm;

the cold-unblocking component comprises a drilling machine, a drilling rod, a water collection tank, and a water supply tank, the drilling rod is connected with a drive end of the drilling machine by the quick connector, one end of the drilling machine is detachably connected with the dovetail groove mounting bracket, and the water collection tank and the water supply tank are respectively arranged on a car flat plate by limiting blocks, the material receiving component is a flow guide groove, upper and lower ends of the upright column are respectively and fixedly connected with an upright column bottom plate and an upright column top plate, the flow guide groove is fixedly connected above the upright column top plate.

2. The unblocking apparatus for the furnace discharging pipe according to claim 1, characterized in that the rail car is composed of the car flat plate, horizontal plates respectively and fixedly connected to lower ends of front and rear sides of the car flat plate, longitudinal plates respectively fixed on both sides of a lower end of the car flat plate, and wheels symmetrically arranged on the longitudinal plate, side surfaces of the longitudinal plates are fixedly connected with both ends of the horizontal plates; and the horizontal plate located on the front side of the car flat plate is provided with a hook and a plurality of protruded stop blocks, and the car flat plate is further provided with a brake mechanism.

3. The unblocking apparatus for the furnace discharging pipe according to claim 2, characterized in that the upright column bottom plate is fixedly connected with the car flat plate, two ends of the gear rack are respectively and fixedly connected with the upright column bottom plate and the upright column top plate, the gearbox is meshed and connected with the gear rack by an internal gear to move along the gear rack, the gearbox is externally provided with a drive shaft, one end of the drive shaft passes through the gearbox and is connected with the gear, the gear can rotate synchronously with the drive shaft.

4. The unblocking apparatus for the furnace discharging pipe according to claim 2, characterized in that the brake mechanism comprises a brake rod of which a rod portion is provided with a thread, a threaded pipe of which an inner wall is provided with a thread, and a brake pad, the threaded pipe is arranged on the car flat plate and is aligned to one of the wheels, the brake rod is thread-connected with the threaded pipe, the brake pad is arranged at a lower end of the brake rod and located between the brake rod and the wheel, and the brake pad is axially and rotatably connected with the brake rod.

5. The unblocking apparatus for the furnace discharging pipe according to claim 2, characterized in that the car flat plate is provided with a plurality of lifting rings.

6. The unblocking apparatus for the furnace discharging pipe according to claim 1, characterized in that the unblocking rod is a solid metal cylinder of which a top portion is a conical barbed structure.

7. The unblocking apparatus for the furnace discharging pipe according to claim 1, characterized in that the drilling rod is a hollow metal cylinder of which a top end is provided with an opening, and the opening is internally embedded with a diamond that is convenient for cutting glass inside the discharging pipe.

* * * * *